E. S. DOBSON.
TRACTOR GUIDING MECHANISM.
APPLICATION FILED APR. 9, 1920. RENEWED NOV. 27, 1920.
1,364,735.
Patented Jan. 4, 1921.
2 SHEETS—SHEET 1.
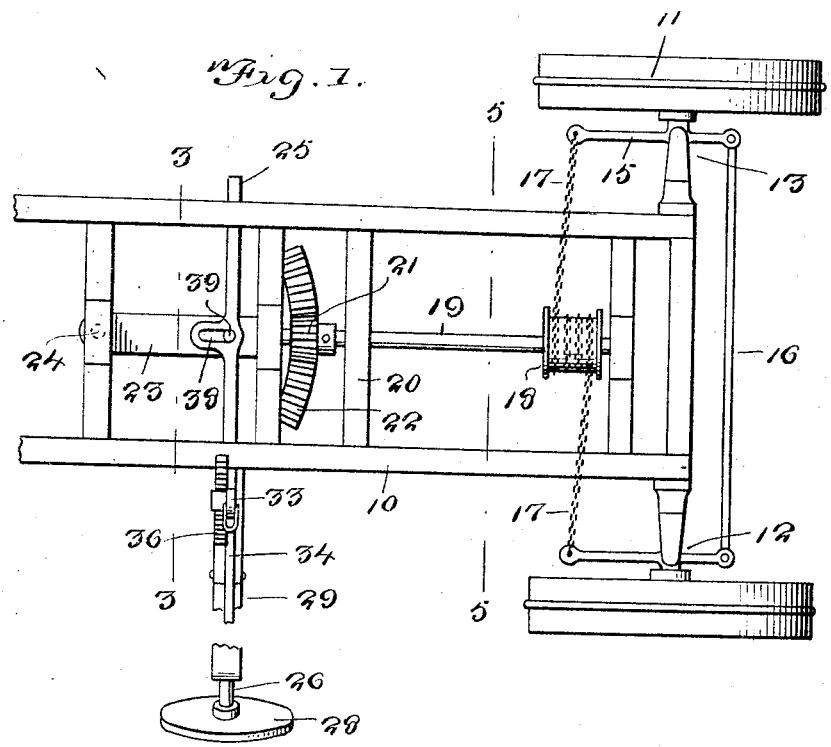
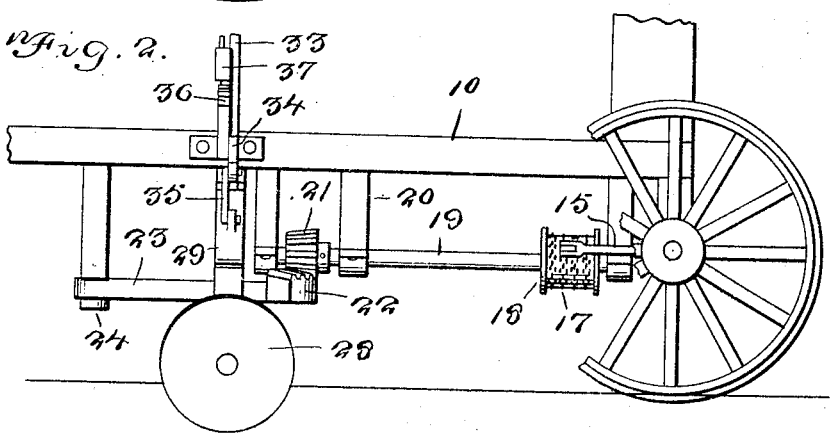
Witnesses
Inventor
E. S. Dobson
By Victor J. Evans
Attorney

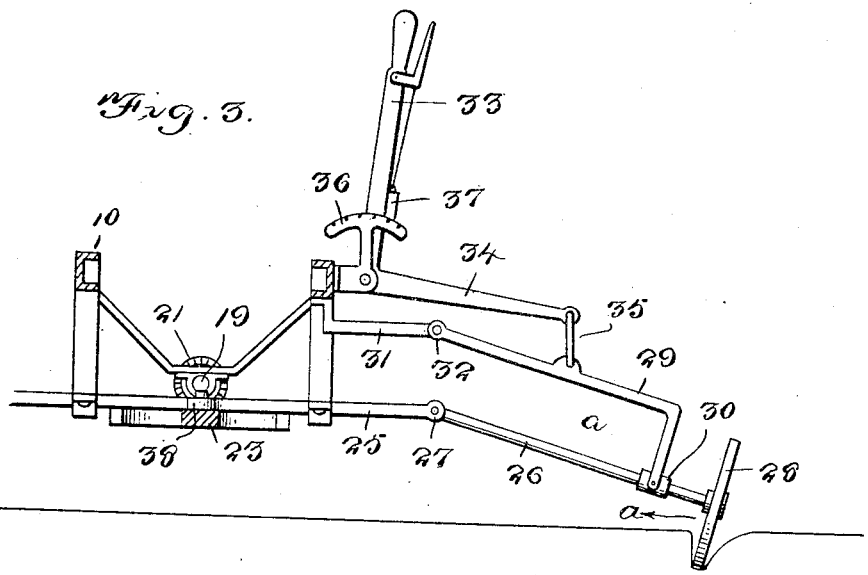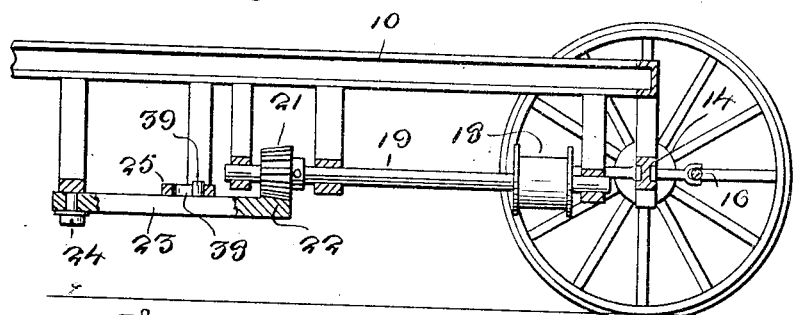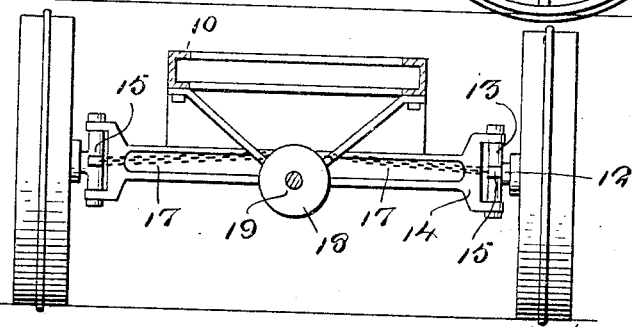

UNITED STATES PATENT OFFICE.

EARL S. DOBSON, OF STIPEK, MONTANA.

TRACTOR-GUIDING MECHANISM.

1,364,735.     Specification of Letters Patent.     Patented Jan. 4, 1921.

Application filed April 9, 1920, Serial No. 372,731. Renewed November 27, 1920. Serial No. 426,850.

*To all whom it may concern:*

Be it known that I, EARL S. DOBSON, a citizen of the United States, residing at Stipek, in the county of Dawson and State of Montana, have invented new and useful Improvements in Tractor-Guiding Mechanism, of which the following is a specification.

The object of the invention is to provide a simple and efficient means for automatically guiding a tractor or equivalent machine so that rows may be run in parallelism without depending upon the effort and close attention of the operator and without the inconvenience and efforts which are incident to the manual guiding of the machine, and at the same time to provide a means by which a more accurate result may be secured; and to this end the invention consists in a construction and combination of parts of which a preferred embodiment is shown in the drawings, it being understood that changes in the form, proportions and details of construction may be resorted to within the scope of the appended claims without departing from the principles involved.

In the drawings:

Figure 1 is a plan view of the apparatus applied in the operative position to a tractor.

Fig. 2 is a side view of the same.

Fig. 3 is a transverse vertical section on the plane indicated by the line 3—3 of Fig. 1.

Fig. 4 is a longitudinal sectional view.

Fig. 5 is a transverse section on the line 5—5 of Fig. 1.

A portion of the tractor frame, indicated merely typically, is shown at 10 having the steering wheels 11 mounted upon spindles 12 which are connected by knuckle joints 13 with the front axle 14, and secured to the wheel spindles for controlling the direction of the steering wheels are the steering levers 15 connected at their rear ends by a rod 16 and having their forward extremities connected by chains 17 with a drum 18 upon which they are oppositely wound, so that the turning of the drum in one direction will reel one chain and unreel the other, or tighten one chain and slack the other, so as to direct the steering wheels either to the right or to the left according to the direction of movement of the drum.

Said drum is carried by a shaft 19 mounted in suitable bearings upon cross bars 20 of the tractor frame and carrying a pinion 21 meshing with a segmental rack 22 carried by an oscillatory lever 23 pivoted as at 24 to the tractor frame and adapted for horizontal transverse swinging movement to impart rotary motion through the shaft 19 and hence to the drum 18 to control the direction of the driving or steering wheels. Connected with the rack carrying arm 23 is a slide 25 mounted transversely upon the tractor frame, and supported by this slide through the intermediate agency of a pivotal arm 26 mounted as at 27 thereon is a furrow disk 28 adapted to operate in the last formed furrow and in contact with the near or land slide thereof, preferably in an inclined or oblique relation to a horizontal plane so as to hug the near wall or side of the furrow with a tendency to apply tensile strain in the direction indicated by the arrow *a* in Fig. 3, so that any variation of the tractor frame from a path directly parallel with the furrow engaged by the disk 28 will result in moving the slide 25 relative to the tractor frame, and hence the communication of motion through the lever 23 and rack 22 to the pinion 21 and hence to the drum 18, to vary the position of the steering wheels and thus correct the variation or deviation of the machine from the proper path and cause it to travel in direct parallelism with the furrow.

In order that the furrow disk may be supported in proper position for engagement with the last formed furrow a suspending means is employed, the same consisting of a swinging arm 29 having a bearing 30 in which the outer portion of the disk arm 26 is fitted, said bearing consisting of a sleeve having a sliding relation with the arm 26, a bracket 31 upon which the swinging arm 29 is pivoted as at 32, a hand lever 33 having an offset arm 34 connected by a link 35 with the swinging arm 29, and a toothed rack 36 traversed by a locking dog 37 carried by the hand lever, and serving as a means of securing said hand lever at the desired adjustment to obtain the furrow disk in the desired and most effective relation with the last formed furrow. The slide 25 is slotted as at 38 to engage a pin 39 on the rack carrying lever 23 to allow for the proper swinging movement of the latter with relation to the transverse path of the slide. Obviously when the guiding mechanism is not in use it may be raised by means of the hand lever to a position out of contact with the soil, but when in operative engagement with the furrow, the slightest tendency of the tractor to vary from the proper and predetermined path in parallelism with the furrow will cause the adjustment of the steering wheels to maintain the proper path, so that the constant attention of the operator of the machine is not required to secure the desired relation between the furrows which are being formed and those which have already been formed in the field.

What is claimed is:—

1. The combination with a tractor having steering wheels and a drum connected therewith for movement in opposite directions to position said wheels, of a furrow disk, a slide mounted upon the tractor frame and supporting said furrow disk, a rack actuable by the slide, and a pinion engaged with the rack and operatively connected with said drum.

2. The combination with a tractor having steering wheels, a drum, steering levers connected with the steering wheels and flexibly connected with said drum, of a pinion carried by the drum, a rack in mesh with and movable relative to the pinion for imparting rotary motion to the drum, a slide mounted for movement transversely of the tractor frame, a furrow disk carried by said slide and adapted to traverse the last formed furrow, and connections between said slide and the rack for varying the latter proportionately to the movement of the furrow disk toward and from the path of the tractor frame.

3. The combination with a tractor having steering wheels and a drum operatively connected with said wheels for rotary movement in opposite directions to vary the positions of the steering wheels, of a pinion carried by the drum, a transversely oscillatory arm mounted upon the tractor frame and having a segmental rack in mesh with said pinion, a slide mounted upon the tractor frame for movement transversely to the path thereof and operatively connected with said oscillatory arm, and a furrow disk carried by the slide and extending laterally from the frame of the tractor for traversing the last formed furrow and movable by the side of such furrow to actuate the slide.

4. The combination with a tractor having steering wheels, a drum having connection with the steering wheel knuckles, a pinion carried by the drum and a rack movable relative to and in mesh with the pinion for communicating rotary movement in opposite direction to the drum, of a slide mounted for movement transversely of the tractor frame and operatively connected with said rack, a furrow disk having a supporting arm pivotally mounted upon said slide and means for supporting said disk in the desired position with relation to a horizontal plane, the same consisting of a swinging supporting arm having a sliding connection with the disk arm, a hand lever, connections between the hand lever and said swinging arm, and means for locking the hand lever in adjusted position.

In testimony whereof I affix my signature.

EARL S. DOBSON.